United States Patent
Su et al.

[11] Patent Number: 6,033,078
[45] Date of Patent: Mar. 7, 2000

[54] REAR VIEW MIRROR UNIT FOR A VEHICLE

[76] Inventors: Li Su, Armegatan 32-607, 171 59 Solna, Sweden; FukSang So, Block F, 1st Floor, 10 South Bay Rd., Repulse Bay, The Hong Kong Special Administrative Region of the People's Republic of China

[21] Appl. No.: 08/913,224
[22] PCT Filed: Apr. 3, 1996
[86] PCT No.: PCT/SE96/00439
   § 371 Date: Sep. 9, 1997
   § 102(e) Date: Sep. 9, 1997
[87] PCT Pub. No.: WO96/31365
   PCT Pub. Date: Oct. 10, 1996

[30] Foreign Application Priority Data
   Apr. 3, 1995 [SE] Sweden .................................. 9501212

[51] Int. Cl.$^7$ ..................................................... G02B 5/08
[52] U.S. Cl. ........................................... 359/856; 359/850
[58] Field of Search ..................................... 359/867, 630, 359/631, 464, 465, 472, 839, 850, 856; 396/330, 331

[56] References Cited

U.S. PATENT DOCUMENTS

| | | | |
|---|---|---|---|
| 5,221,990 | 6/1993 | Cook | 359/850 |
| 5,587,836 | 12/1996 | Takahashi et al. | 359/630 |

FOREIGN PATENT DOCUMENTS

| | | |
|---|---|---|
| 0455843 | 11/1991 | European Pat. Off. . |
| 2240618 | 3/1975 | France . |
| 936074 | 11/1955 | Germany . |
| 2014696 | 3/1970 | Germany . |
| 2014696 | 10/1971 | Germany . |
| 3335981 | 4/1985 | Germany . |
| 3335981 | 10/1988 | Germany . |
| 4235744 | 5/1994 | Germany . |
| 9218353 | 10/1992 | WIPO . |
| 9532103 | 11/1995 | WIPO . |

*Primary Examiner*—Loha Ben
*Attorney, Agent, or Firm*—Ostrolenk, Faber, Gerb & Soffen, LLP

[57] ABSTRACT

An optical rear view mirror unit for motor vehicles comprises a plurality of converging optic elements and at least one intermediate optic element. The said each converging optic element is either a converging lens or a concave mirror comprisisng at least one single optic component, and the said intermediate optic element is either a said converging optic element or a simple reflector, by which a first converging optic element is an imaging optic element, located outside a vehicle, to form a first inverted image which is in or in the vicinity of an intermediate optic element, effecting the said intermediate optic element to direct the rays, from the first imaging optic element towards a second imaging optic element. The said second imaging optic element is located inside a vehicle, to form a second upright image which is in or in the vicinity of the last converging optic element in the said mirror unit, effecting the said last converging optic element further converge and redirect the rays from the said second imaging optic element towards the eyes of an observer. The optical axis after passing through the first imaging optic element is traveling forwardly and inwardly of a vehicle, at an acute angle to the longitudinal axis of a vehicle; and the said optical axis, after reflected by a reflecting interface of the said intermediate optic element, is traveling backwardly and inwardly, also at an acute angle to the longitudinal axis of a vehicle. The sum of the said two angles is less than 90 degrees. At least one refracting prism may be added either before or after the said first or the second imaging optic element if needed, to further deflect the light to the desired pathway.

30 Claims, 4 Drawing Sheets

REAR VIEW MIRROR UNIT FOR A VEHICLE

DESCRIPTION

The present invention generally relates to an optic rear view device for use on motor vehicles, especially on road transport vehicles, although it can be adapted for use on other types of vehicles as well.

The conventional rear view system for a vehicle comprises two exterior mirrors and one supplementary interior mirror. This system obviously has many drawbacks. The conventional exterior mirrors cause aerodynamic resistance and noise at high speed, are vulnerable to damage, and may lead to conflict injuries. They also break the vehicle's entire harmony of the stream-lined round shape and smoothness. During winter or in dirty environments, both the side windows and the surface of the exterior mirrors become contaminated which makes the image difficult to see. Furthermore, the placement of the exterior mirror on the driver's side forms an angle of about 55° between the longitudinal axis of the vehicle and the center of the mirror to the eyes of the driver, causing complete loss of the important front view when looking at the exterior mirror. These disadvantages of the exterior reflecting mirrors make the rear view system undesirable and may cause dangers of many kinds on the road. It also becomes more and more prominently against the concept of the modem vehicle design.

Many efforts on the optic means have been made to overcome the many problems of the conventional exterior mirrors. Almost all such devices have been concerning multiple combination of optic elements by means of both refraction and reflection. One common feature of such disclosures has been attempting to reduce the large protrusion of the exterior mirror body, while providing the rear view within a vehicle with more proximity to the driver. Among such optic devices disclosed by patent documents PCT/GB89/01505, PCT/GB92/00659 and DE 3146486 A1 applied prismatic refractors, to deflect the light from objects behind a vehicle towards a reflector, which is placed forwardly of an observer so as to be in his field of view. Other attempts, as disclosed by patent documents DE 33 35 981 A1; DE, A, 2 014 696; DE, C, 936 074 and FR, B1, 2 240 618 applied plurality of lenses, or a combination of lenses and prismatic means as refractor, plus simple or prismatic reflector or reflectors to form the rear view system. However, such devices suffer from either the optical defects which would destroy the quality of the image, or the complexity itself. Besides, many of them require improper occupation of space on the side door or within a vehicle which would have already been overstuffed by the instruments. Therefore very few of them have achieved practical and commercial significance.

It is the aims of the present invention to provide a vehicle with an optical rear view mirror unit, which would eliminate the drawbacks of the conventional exterior reflecting mirrors, also eliminate the drawbacks of the said prior arts. It is another aim of the present invention to provide such an optical mirror unit which would not require major reconstruction both on the side and within a vehicle.

The said invention embodying the said aims comprises several forms and embodiments. According to one aspect of the invention, there is provided an optical mirror unit for a vehicle, comprises plurality of converging optic elements. The said each converging optic element is either a set of converging lens or a concave mirror comprising at least one single optic component, separated from one another to capture the light from objects behind a vehicle, to form real or virtual images, as well as to diminish or magnify the images; In one form of the said mirror unit, there are provided three basic converging optic elements and at least one another converging optic element thereafter. In which the first converging optic element is a first imaging optic element located outside a vehicle, to form a first inverted image at a focal plane which at least partly coincide or near a reflecting interface of, or which is in or in the vicinity of the second converging optic element, effecting the said second converging optic element to collect as well as to direct the rays from the first converging optic element towards the third converging optic element. The said third converging optic element is a second imaging optic element located inside a vehicle, to form a second upright image towards the said at least one another converging optic element thereafter, preferably in or in the vicinity of the last converging optic element in the said mirror unit, effecting the said last converging optic element to redirect the rays from the said third converging optic element towards the eyes of an observer. The focal length (or effective focal length) of the said second and the third converging optic elements are both equal to, or shorter than the focal length of the said first converging optic element. The distance between any two neighboring converging optic elements of the said three basic converging optic elements is shorter than the sum of their focal length (or effective focal length) of the said any two neighboring converging optic elements. The said various converging optic elements are the basic components of the said mirror unit. In the preferred embodiments, the said three basic converging optic elements are formed as converging lenses, and the second converging lens is directly coated with proper high reflecting material on one side, to form a reflecting rear interface serving both as a lens and a reflector, to converge as well as to bend the light rays, at an angle less than 90°, from the first converging lens towards the third converging lens.

According to another aspect of the said invention, there is provided an optical mirror unit for a vehicle, to which it may be further provided other optical elements, comprising at least one refracting prism, preferably wedge prism with at least one interface being planar while the other interface being either planar or positive off-axis parabolic. The prism or prisms are applied to deflect the light towards the desired pathway for the said optical mirror unit. In the preferred embodiments, the said refracting prism or prisms may be placed before or after at least one of the said converging lens, directly in touch with it or separated by a space between them.

It should be appreciated that the said various converging lenses applied throughout the embodiments are all positive lenses as a whole, each having at least one single lens, and the said single lens is having either plano-convex, bi-convex or meniscus shape. The said each converging lens may also be formed as a doublet or a triplet, comprising at least one positive lens. In this case, the optic elements may be either cemented together or separated each other by a short space. The said lenses may be cut into different shapes as an example rectangular in shape. The convex surface of the said lenses may be spherical or aspherical, and the convex surface of the said bi-convex lens may be symmetric or asymmetric. The concave surface of the said various concave mirror or mirrors may be either spherical or aspherical.

It should be also appreciated that the description of the said mirror unit mainly deals with the converging optic elements, in relation to their focal lengths, their locations, and their imaging characteristics etc, and the term "converge" only applies to the said converging optic elements, which may focus the parallel light to their focal point, may form real or virtual images, may diminish or magnify the said images, to differentiate the distinct optic nature of them from that of the refracting prism and plane mirror. For the latter the terms "deflect" and "reflect" have been applied respectively.

It should be further appreciated that the descriptions and figuring of the present invention is not intended to limit the scope of it. Various changes and modifications may be made without departing from the scope of the said invention.

The various embodiments of the present invention are hereby explained via examples illustrated by figures bellow, of which:

Figure 1A:
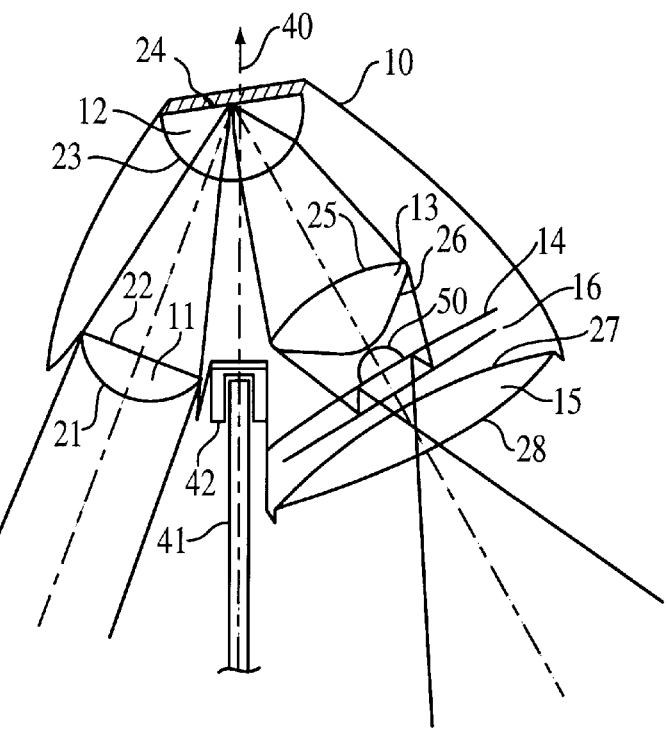
FIG. 1(a) is a schematic sectional over-view of a first embodiment of the present invention.
Figure 1B:
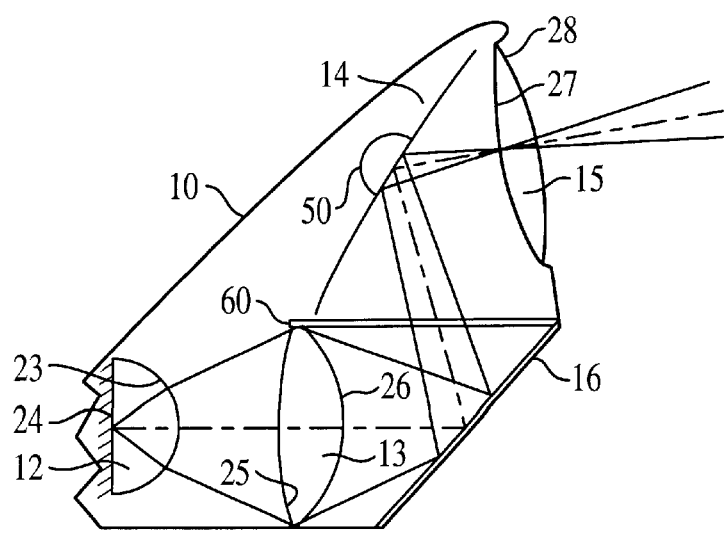
FIG. 1(b) is a schematic sectional side-view of the first embodiment shown in FIG. 1(a)

Referring to the first embodiment shown in FIG. 1, the whole optical mirror unit is indicated by a boundary outline with a reference numeral 10. The line 40 is the body line of a vehicle, to the right is the interior section. The side window screen and the "u" shaped metal slot which hold the said window screen are indicated by numerals 41 and 42. The arrow indicate the direction of the vehicle movement.

The optical mirror unit shown in FIG. 1 comprises 5 converging optic elements: An objective lens 11, a collecting lens 12, a transmitting lens 13, a concave mirror 14, and an ocular lens 15.

The objective lens 11 is located outside a vehicle defined by the body line 40, having two interfaces 21 and 22, with interface 21 outwardly and backwardly of a vehicle receiving light from objects behind a vehicle, and the interface 22 inwardly and forwardly of a vehicle facing the collecting lens 12. The collecting lens 12 may be located partly within and partly outside a vehicle, having a front interface 23, and a rear interface 24 which is coated with appropriate reflecting materials to form a reflecting Is interface. The collecting lens 12 has an effective focal length which is decided by the focal length of the lens used and the curvature of the reflecting surface. For a plano-convex lens with reflection coating on the piano side, the effective focal length is half of the focal length of the lens if its reflecting rear interface is at the lens principal plane, or slightly more than half of the focal length of the lens if the reflecting rear interface is beyond that principal plane. For a bi-convex lens, the converging effect of the reflecting rear interface has to be counted in. The said collecting lens 12 is preferred to be having a plano-convex shape. More particularly, having a reflection surface on the plano-side and a spherical or aspherical surface on the convex-side. The said spherical surface of the said plano-convex lens may be further formed to have a curvature of a half of a sphere; And the said aspherical surface of the said plano-convex lens may be further formed to have a curvature of a paraboloid. The preferred collecting lens 12 with reflection coating on one side may also be separated into a simple converging lens as collecting lens and a simple reflector, and the said simple reflector may be placed either before or after the said simple converging lens. The collecting lens 12 has multiple functions. It acts both as a converging lens and a reflector, it may also be used to adjust the field of view.

The collecting lens 12 may be placed with its reflecting rear interface 24 inclined to the body line 40, also inclined both to the objective lens 11 and the transmitting lens 13 as such that the converging rays from objective lens 11 is first incident to its front interface 23, converged towards its reflecting rear interface 24 on which the rays are reflected, further converged, at an opposite direction towards the transmitting lens 13. The optical axis after passing through the objective lens 11 is traveling forwardly and inwardly of a vehicle, at an acute angle (<45°) to the body line 40, and the said optical axis, after reflected by the reflecting interface 24 of collecting lens 12, is traveling backwardly and inwardly of a vehicle, also at an acute angle (<45°) to the body line 40. The sum of the said two angle is less than 90°. An inverted, also dimished first image of the objects behind a vehicle is formed after the objective lens 11, at a focal plane which is at least partly coincide or near the reflecting interface 24 of collecting lens 12. In the case that the said collecting lens is separated into a simple converging lens and a simple reflector, the said first inverted image is formed at a focal plane, which is in or in the vicinity of the said simple converging lens instead. The light rays coming out of the rear interface 26 of transmitting lens 13 are converged at a focal plane far behind the transmitting lens 13, with a distance between the said focal plane and the transmitting lens 13 much longer than the focal length of the transmitting lens 13 itself, to form an upright second image, preferably in or in the vicinity of the last converging optic element in the mirror unit. The construction and the location of the said collecting lenses ensures that it does not affect much the procedure of the image formation by-the objective lens 11 and the transmitting lens 13, but rather collect more light rays from objective lens 11 and direct the rays towards the transmitting lens 13 which would otherwise not be received by the latter.

The said first three converging optic elements, namely the objective lens, the collecting lens and the transmitting lens, actually can be regarded as the pre-image part or the basic part of the said mirror unit. It provide light rays to be further converged by at least one another converging optic element thereafter, and finally viewed by an observer. Their arrangement, among other things, depends on the focal length (if there is only one converging optic element after the transmitting lens), or combination focal length (if there are more than one converging optic element after the transmitting lens) of the said converging optic element or elements. Also depends on the distance between the last converging optic element and the eyes of an observer. In the preferred embodiments, the said three basic converging optic elements are characterized as such that the focal length (or effective focal length) of collecting lens and the focal length of transmitting lens are both equal to, or shorter than the focal length of objective lens; also characterized as such that the anterior focal point of the transmitting lens and the posterior focal point of the objective lens is coincide or close to each other. The distance between the collecting lens and the objective lens is shorter than the sum of the focal length (or effective focal length) of collecting lens and the focal length of objective lens, and the distance between the transmitting lens and the collecting lens is shorter than the sum of the focal length of transmitting lens and the focal length (or effective focal length) of collecting lens.

The light rays, after passing through the transmitting lens 13, may be further converged by two converging optic elements, with each of the said converging optic element to be either a converging lens or a concave mirror. In FIG. 1, the said two converging optic elements are formed as one concave mirror 14 and one ocular lens 15. The said concave mirror 14 may be reflection coated either on its front or rear interface. The ocular lens 15 in this case has a front interface 27 and a rear interface 28. The ocular lens 15 also has a diameter or dimension larger than that of the transmitting lens 13. The arrangement of the said two converging optic elements, after the said transmitting lens 13, may be characterized as such that the distance between the first said converging optic element and the transmitting lens 13 is shorter than the sum of their focal lengths, and the distance between the first and the second said converging optic elements is also shorter than the sum of their focal lengths. Another plane mirror 16 is located between the transmitting lens 13 and the concave mirror 14, with its reflecting interface inclined both forwardly and outwardly of a vehicle, and upwardly of the horizontal plane of the ground. The light rays, after passing through the transmitting lens 13, is incident to the reflecting interface of the said plane mirror 16, on which the rays are reflected, forwardly of a vehicle, towards the concave mirror 14; And the light rays, from the plane mirror 16, is incident to the reflecting interface of the concave mirror 14, on which the rays are converged and reflected, rearwardly of a vehicle, towards the said ocular lens 15.

The whole mirror unit may be constructed as a single piece, with all the optic elements, or elements except the ocular lens 15 being a sealed close part to avoid outside contamination. The spaces within the closed part may be filled by air, gases other than air or liquids. The contour of the mirror unit has a "head" comprising the objective lens 11, a "neck" comprising the collecting lens 12, and a "body" comprising other optic elements. The "head" is located outside a vehicle, the "neck" is partly within and partly outside, while the "body" is all within a vehicle defined by the body line 40.

As can be appreciated from FIG. 1(*b*), the concave mirror 14 in this case is preferred to be located approximately above the level of transmitting lens 13, and is made adjustable itself by a ball joint structure 50 behind it. The concave mirror 14 may also be placed beside the said transmitting lens 13 instead of above it. The whole mirror unit may have a shell which form the outward cover of the closed part, and the shell may be constantly prolonged upwardly to form a bell-shaped shell, with its narrow base sheltering the concave mirror 14, and its wide opening pointing to the direction of an observer. A transparent screen 60 may be placed above the space between the plane mirror 16 and the transmitting lens 13, it should not affect the rays from the plane mirror 16 to the concave mirror 14. A transparent screen may also be fitted onto the said opening of the said bell-shaped shell. The said transparent screen or screens may be designed to be removable, and the elements within the closed part can be cleaned periodically. A heating device may be also included to the mirror unit, and it may be characterized by making slots around the middle of the edge of various optic elements, the slots then may be encircled by electrical heating wire. By power supply the optic elements is heated. Alternatively or simultaneously, the heating may be accomplished by sending clean warm air into the closed part, through the shell of the mirror unit. The air can be sent back through another tube out of the mirror unit.

Figure 2A:
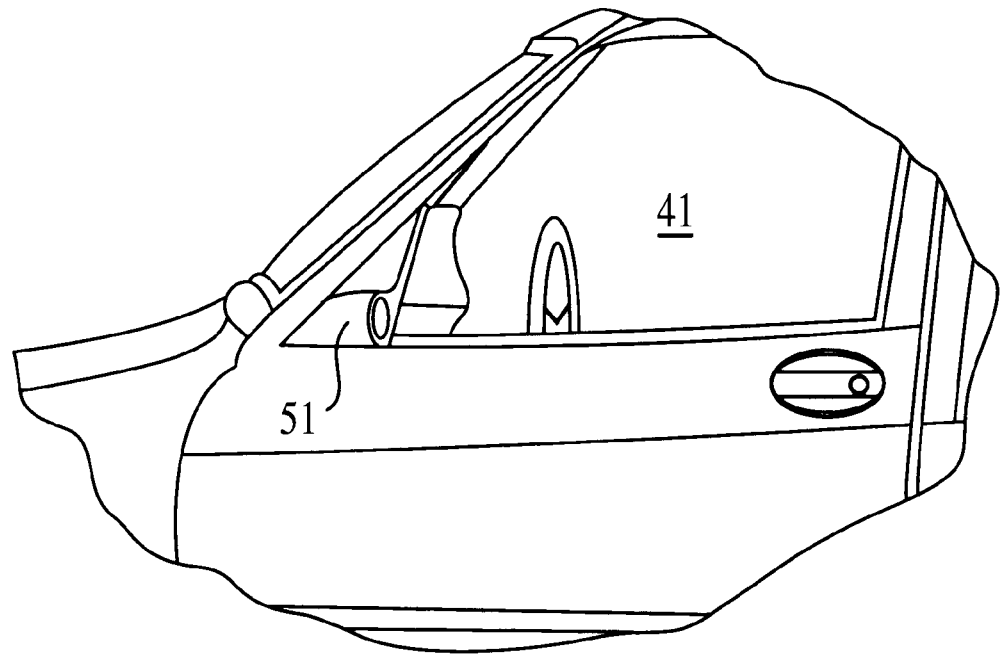
FIG. 2(a) is a schematic perspective view from outside a vehicle exemplifying the characteristic of the present invention formed according to its principle.
Figure 2B:
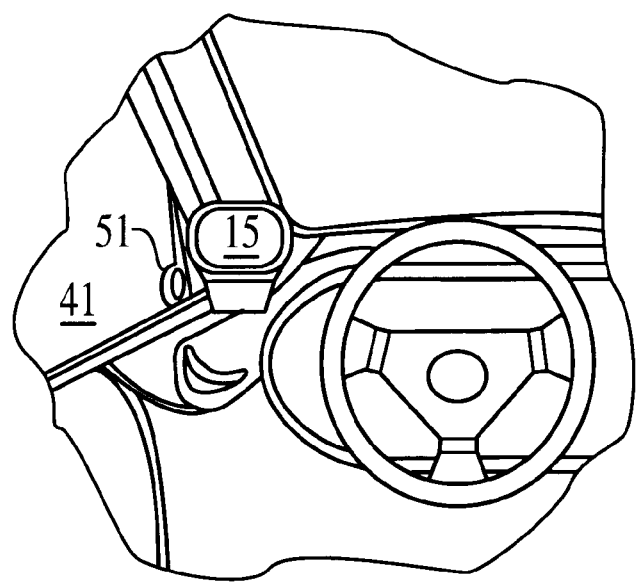
FIG. 2(b) is a schematic perspective view from within a vehicle exemplifying the characteristic of the present invention formed according to its principle.

The outward characteristics formed according to the principle of the present invention are illustrated in FIG. 2 (*a*) and (*b*). It is preferred to install the said mirror unit via the metal triangle area on the side door of a vehicle as shown in the figures, but it may also be installed via other component on the side of a vehicle, as examples via the area on the side door bellow the said metal triangle area, or the area on the side forwardly of the side door. A hiding cover 51 may be provided to conceal the outside part of the said mirror unit, as well as to give it an aerodynamically streamlined shape. The said hiding cover 51 may have a bell-shaped aperture, with its narrow base surrounding the edge of the objective lens 11 while its opening pointing towards the rear of a vehicle. The outmost point of the interface 21 of the objective lens 11 is still within the canal of the bell-shaped aperture of the said cover 51, it is designed to avoid rain, dust and other contaminations onto the interface 21 of the objective lens 11.

The "head" of the said mirror unit may be stretched out of a vehicle by making a hollow via the said triangle area, without affecting the said metal slot 42 which hold the side window screen 41. In the case that the said metal slot 42 has to be removed, the outward body of the mirror unit itself may be built with a slot on it to hold the side window screen 41.

The light rays, after passing through the transmitting lens, may be further converged by just one another converging optic element thereafter instead of two as mentioned earlier, to reduce the number of the converging optic elements in the mirror unit and thus to reduce the cost. The said one another converging optic element can be either a converging lens, or a concave mirror. One such embodiment is shown in FIG. 3.

Figure 3:
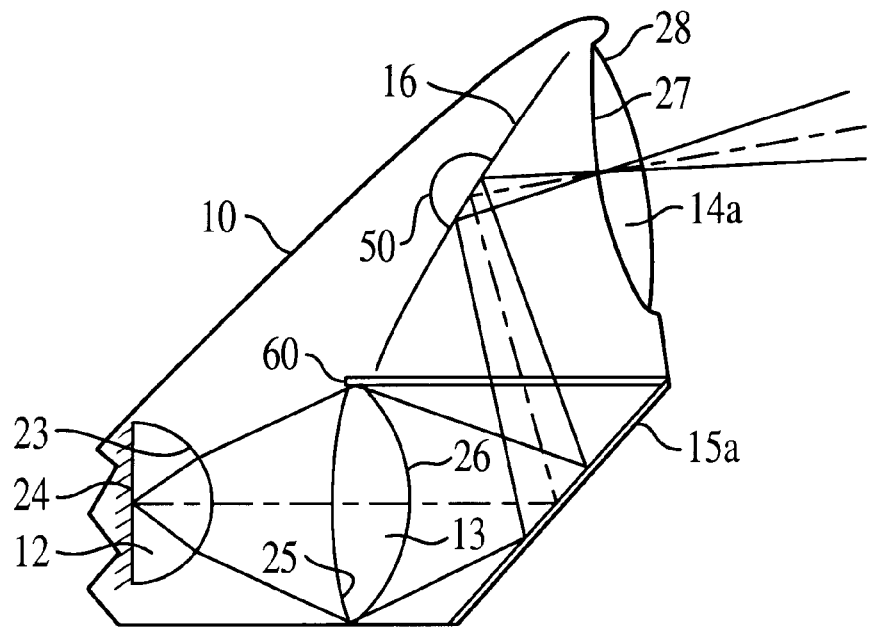
FIG. 3 to FIG. 5 are the schematic sectional side-views and over-views of further embodiments of the present invention.

The embodiment in FIG. 3 is similar in principle to that in FIG. 1 and the same reference numerals have been used for the first three corresponding elements. The difference between these two embodiments is that the converging optic element after the transmitting lens 13 is formed as one converging lens to be the ocular lens in FIG. 3.

The said ocular lens in FIG. 3 is indicated by a numeral 14*a*, having a front interface 27 and a rear interface 28. Two plane mirror 15*a* and 16 are located between the said transmitting lens 13 and the said ocular lens 14*a*. The light rays, after passing through the said transmitting lens 13 is incident to the reflecting interface of the first plane mirror 15*a*, on which the rays are reflected, forwardly of a vehicle, towards the second plane mirror 16; The light rays, from the first plane mirror 15*a*, is incident to the reflecting interface of the second plane mirror 16, on which the rays are reflected, backwardly of a vehicle, towards the said ocular lens 14*a*.

In one form of the said mirror unit, the second converging optic element in the said mirror unit is formed as a converging lens with or without reflection coating. In the former case, the said converging lens is even prefered to be a plano-convex lens with reflection coating on the plano-side, and to have a convex surface curvature of either a half of a sphere or a paraboloid, to avoid unsymmetry and other optic defects on the optic train. The said second converging optic element may also be a concave mirror, also acting both as a converging optic element and a reflector to converge as well as to reflect the rays. In this case, the said concave mirror is having its own focal length and is having the same function as the said converging lens. Such an embodiment is shown in FIG. 4.

Figure 4:
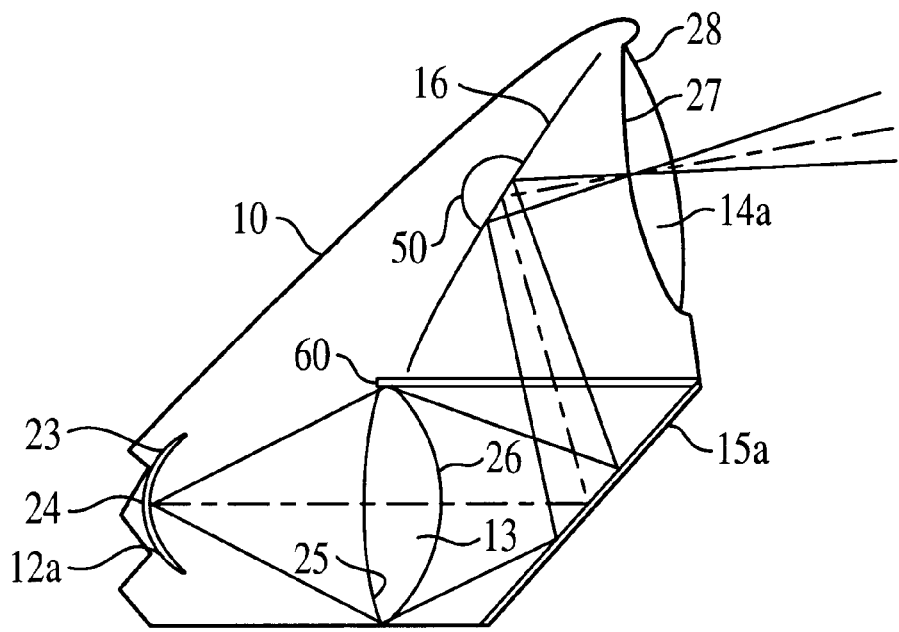

The embodiment in FIG. 4 is similar in principle to that in FIG. 1 or FIG. 3 and the same reference numerals have been used for the corresponding optic elements. The difference between these two embodiments is that the second converging optic element in the mirror unit is formed as a concave mirror 12a in FIG. 4. The converging rays from objective lens 11 are incident to the reflecting interface of the said concave mirror 12a, on which the rays are converged and reflected, at an opposite direction, towards the transmitting lens 13. The said first inverted image after the objective lens 11 is formed at a focal plane, which is at least partly coincident with or near the reflecting interface of the said concave mirror 12a.

In another form of the said mirror unit, the said second converging optic elements is formed as a converging lens or a concave mirror with reflection coated on one side, to form a reflecting interface to converge as well as to reflect the rays. The "converge" effect of the said converging lens or concave mirror is primarily collect more rays from the first converging optic element, and to direct the said rays towards the third converging optic element in the said mirror unit. The said more rays, if without the said "converge" effect by the said converging lens or concave mirror, will be lost and will not be recieved by the said third converging optic element. But, if without considering the said more rays, the said converging lens or concave mirror may even be replaced by a simple plane mirror.

The said plane mirror in this case acts just as a simple reflector. The converging rays from objective lens is incident to its reflecting interface, on which the rays are reflected, at an opposite direction towards the transmitting lens. The optical axis after passing through the objective lens is traveling forwardly and inwardly of a vehicle, at an acute angle (<45°) to the body line 40, and the said optical axis, after reflected by the reflecting interface of the said plane mirror, is traveling backwardly and inwardly of a vehicle, also at an acute angle (<45°) to the body line 40. The sum of the said two angle is less than 90°. An inverted, also dimished first image of the objects behind a vehicle is formed after the objective lens, at a focal plane which is at least partly coincident with or near the reflecting interface of the said plane mirror. The light rays coming out of the said transmitting lens are converged at a focal plane far behind the transmitting lens, with a distance between the said focal plane and the transmitting lens much longer than the focal length of the transmitting lens itself, to form an upright second image, preferably in or in the vicinity of the last converging optic element in the mirror unit.

The optical axis, after passing through the first three converging optic elements, and after reflected by the reflecting interface of the second converging optic element, is intended to point to, or nearly to the direction of an observer. But in some cases this intention may not be achieved, especially when the position of an observer is more close to the body line 40. To overcome the problem, refracting prism or prisms may be needed to deflect the rays. The number and the power of the prism depends on the desired angle of deflection of light rays. For an observer whose position is far away from the body line 40, only one piece of prism may be needed or may not be needed at all, and the said prism or prisms may be needed to be less powerful. The said prism or prisms may be added before or after at least one of the said converging element of the mirror unit, directly in touch with it or separated by a space between them. In the preferred embodiments, the said prism or prisms are being added before or after the objective lens 11 or/and the transmitting lens 13.

The said prism or prisms each has a "heel" and an "apex", also has a front interface and a rear interface. In the case that the prism is added before or after objective lens 11, it is with its "heel" inwardly while its "apex" outwardly of a vehicle. And the light rays, from objects behind a vehicle or after passing through objective lens 11, is incident to the front interface of the said prism, and is with the direction of the optical axis traveling forwardly and inwardly of a vehicle at an acute angle to the body line 40, and the said angle become larger after out of the rear interface of the said prism; In the case that the said prism is added before or after the transmitting lens 13, it is with its "heel" outwardly while its "apex" inwardly of a vehicle. And the light rays, after reflected by the interface 24 of collecting lens 12 or after passing through the transmitting lens 13, is incident to the front interface of the said prism, and is with the optical axis traveling backwardly and inwardly of a vehicle, also at an acute angle to the body line 40, and the said angle become smaller after out of the rear interface of the said prism.

In the case that the said prism is directly in touch with the said converging lens, it is with its one interface parallel while the other inclined to the principle plane of the converging lens, the edge thickness of the said lens may be reduced as such that the one interface of the said prism which contact the said lens is at or near the principle plane of the said lens. In the case that the said prism is separated with the said converging lens, it is with its one interface inclined to the said converging lens, while the other inclined to the incident rays upon it or inclined to another converging element adjacent to it.

Figure 5:
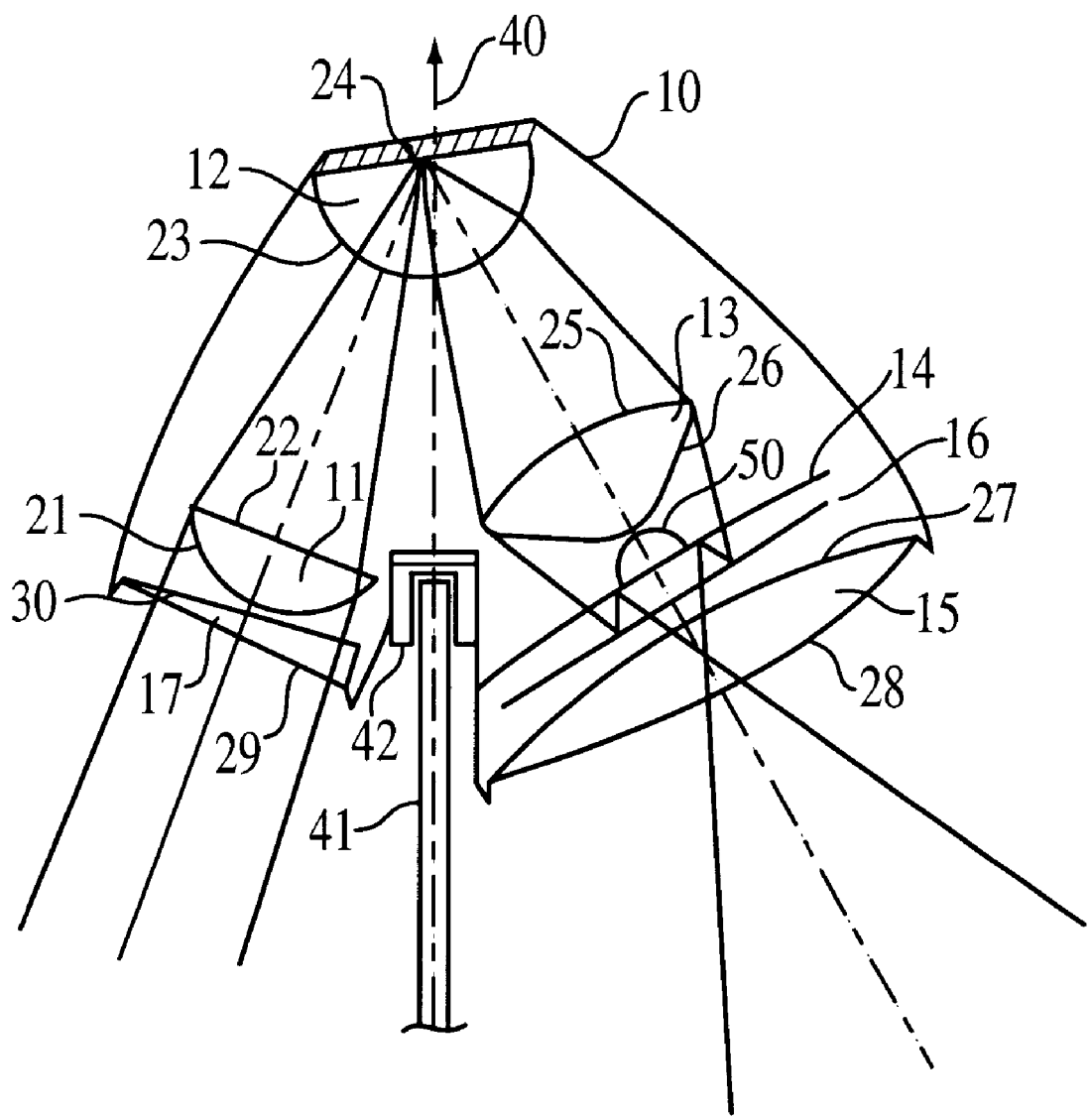

One such embodiment exemplifying an optical mirror unit which applies the said prism or prisms is shown in FIG. 5.

The embodiments shown in FIG. 5 are similar in principle to that in FIG. 1, and the same reference numerals have been used for corresponding elements. The difference between the embodiments in FIG. 1 and FIG. 5 is that there is applied one refracting prism to the latter, and the said prism is placed before the objective lens 11 separated from it by a short space. The individual prism in FIG. 5 is indicated by a numeral 17, with two interface 29 and 30. The prism 17 in these case also has a diameter or dimension equal to, or larger than that of the corresponding objective lens 11.

We claim:

1. An optical rear view mirror unit, for a vehicle, comprising a converging objective element for forming an inverted image, a converging collecting element for collecting and directing light rays, and a converging transmitting element for forming an upright image, characterized in that said objective element forms said inverted image at a focal plane of said objective element which is in said collecting element or in the vicinity of said collecting element whereby said collecting element collects light rays from said objective element and directs said light rays toward said transmitting element.

2. An optical rear view mirror unit according to claim 1, characterized in that said focal plane of said objective element is at least partly coincident with or near a reflecting interface of said collecting element.

3. An optical rear view mirror unit according to claim 2, characterized in that the focal length or effective focal length of said collecting element is equal to or shorter than the focal length of said objective element.

4. An optical rear view mirror unit according to claim 2, characterized in that said objective element, said collecting element, and said transmitting element are arranged such that said objective element can be located outside a body line of said vehicle so as to form said inverted image outside said body line of said vehicle, while said transmitting element can be located inside the body line of said vehicle in order to form said upright image inside said body line of said vehicle.

5. An optical rear view mirror unit according to claim 4, characterized in that the optical axis of the light passing through said rear view mirror unit before reflection by said collecting element extends forwardly and inwardly of said body line of said vehicle and after reflection by said collecting element extends rearwardly and inwardly of said body line of said vehicle, wherein the angle between said optical axis before and after reflection by said collecting element is less than 90°.

6. An optical rear view mirror unit according to claim 2, characterized in that the optical axis of the light passing through said rear view mirror unit before reflection by said collecting element extends forwardly and inwardly of said body line of said vehicle and after reflection by said collecting element extends rearwardly and inwardly of said body line of said vehicle, wherein the angle between said optical axis before and after reflection by said collecting element is less than 90°.

7. An optical rear view mirror unit according to claim 1, characterized in that the focal length or effective focal length of said collecting element is equal to or shorter than the focal length of said objective element.

8. An optical rear view mirror unit according to claim 1, characterized in that one of said converging optical elements is formed as a positive converging lens.

9. An optical rear view mirror unit according to claim 1, characterized in that one of said converging optical elements is formed as a set of lenses and comprises at least one positive lens.

10. An optical rear view mirror unit according to claim 1, characterized in that one of said converging optical elements is formed as a concave mirror.

11. An optical rear view mirror unit according to claim 1, characterized in that said collecting element comprises a positive lens which has a reflective member so as to act as a converging lens as well as a reflector.

12. An optical rear view mirror unit according to claim 11, characterized in that said reflective member is a reflective coating in one side of said positive lens.

13. An optical rear view mirror unit according to claim 11, characterized in that said reflective member is a reflector separate from said positive lens.

14. An optical rear view mirror unit according to claim 11, characterized in that said positive lens is formed as a plano-convex lens having a plane surface and an opposing surface, wherein said plane surface has said reflective member.

15. An optical rear view mirror unit according to claim 14, characterized in that said opposing surface is spherical.

16. An optical rear view mirror unit according to claim 15, characterized in that said spherical surface constitutes a half of a sphere.

17. An optical rear view mirror unit according to claim 14, characterized in that said opposing surface is aspherical.

18. An optical rear view mirror unit according to claim 17, characterized in that said aspherical surface is a paraboloid.

19. An optical rear view mirror unit according to claim 14, characterized in that said reflective member is a reflective coating on said plane surface.

20. An optical rear view mirror unit according to claim 14, characterized in that said reflective member is a reflector separate from said plane surface.

21. An optical rear view mirror unit according to claim 1, characterized in that said collecting element comprises a concave mirror.

22. An optical rear view mirror unit according to claim 11, characterized in that the respective focal lengths or effective focal lengths of said collecting element and transmitting elements are both equal to or shorter than the focal length of said objective element.

23. An optical rear view mirror unit according to claim 1, characterized in that said upright image is formed at an image plane located behind said transmitting element, wherein the distance between said image plane and said transmitting element is longer than the focal length of said transmitting element.

24. An optical rear view mirror unit according to claim 23, characterized in that said image plane is in or in the vicinity of a last converging optical element of said mirror unit.

25. An optical rear view mirror unit according to claim 1, characterized in that it further comprises at least one additional converging optic element.

26. An optical rear view mirror unit according to claim 25, characterized in that said at least one additional converging optic element comprises at least one optical component wherein said optical component is a converging lens or a concave mirror.

27. An optical rear view mirror unit according to claim 1, characterized in that it further comprises a prism in series with said converging optical elements.

28. An optical rear view mirror unit according to claim 27, characterized in that said prism is arranged for directing light toward said objective element.

29. An optical rear view mirror unit according to claim 1, characterized in that it comprises a cover wherein said cover conceals said objective element and an outmost point of said objective element is within said cover.

30. An optical rear view mirror unit according to claim 1, characterized in that said objective element, said collecting element, and said transmitting element are arranged such that said objective element can be located outside a body line of said vehicle so as to form said inverted image outside said body line of said vehicle, while said transmitting element can be located inside the body line of said vehicle in order to form said upright image inside said body line of said vehicle.

* * * * *